Oct. 7, 1958
R. M. INGHAM, JR
2,854,730
QUILL HANDLING AND POSITIONING MECHANISM
Filed Feb. 19, 1954
4 Sheets-Sheet 1
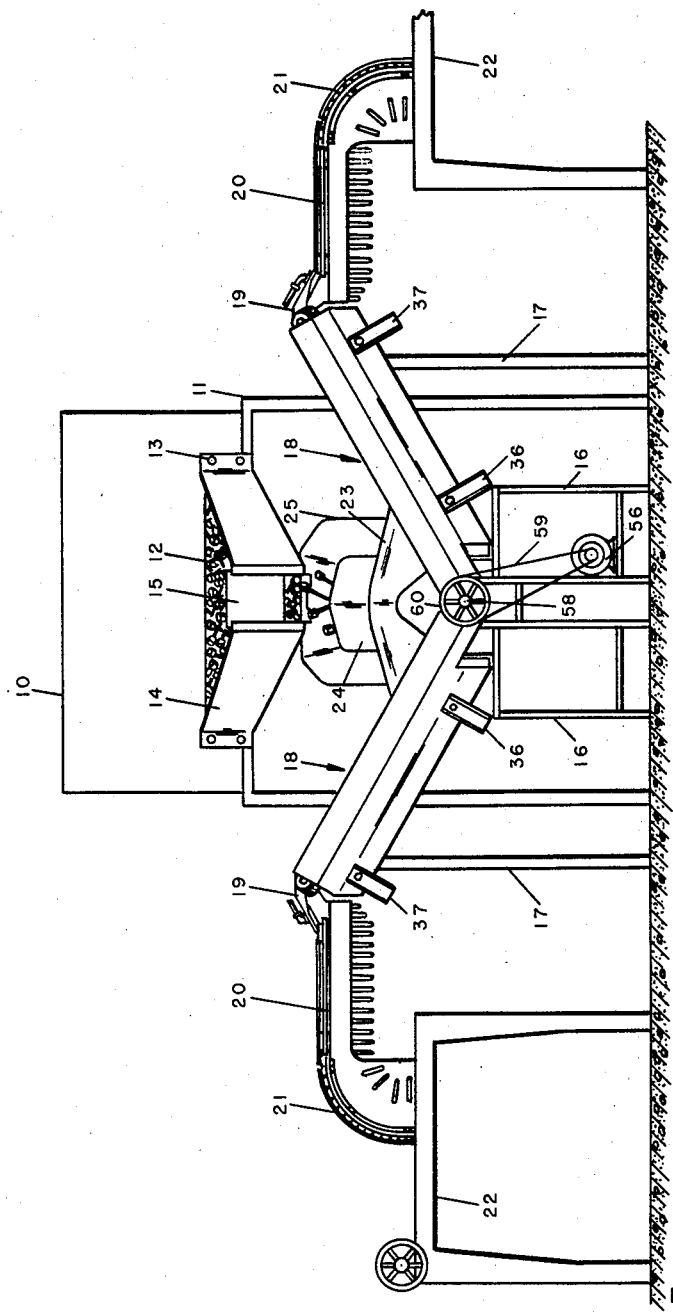
FIG.-1-
INVENTOR.
ROBERT M. INGHAM, JR.
BY
ATTORNEY Oct. 7, 1958  R. M. INGHAM, JR  2,854,730
QUILL HANDLING AND POSITIONING MECHANISM
Filed Feb. 19, 1954  4 Sheets-Sheet 2
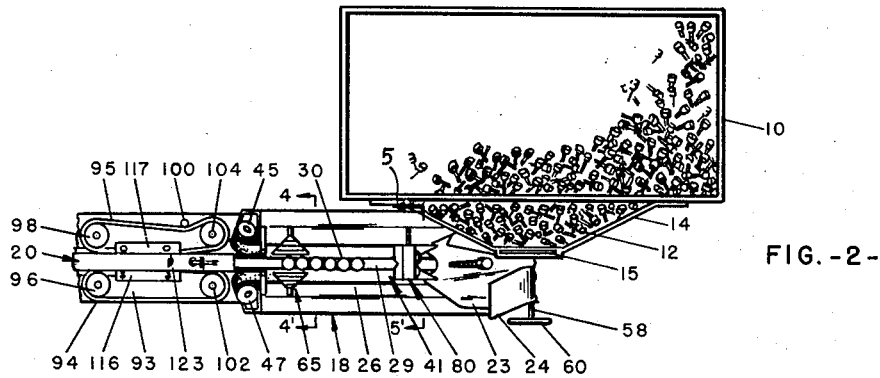
FIG.-2-
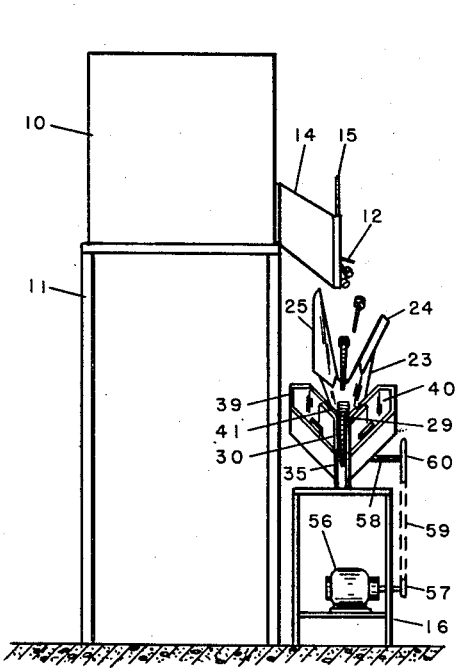
FIG.-3-
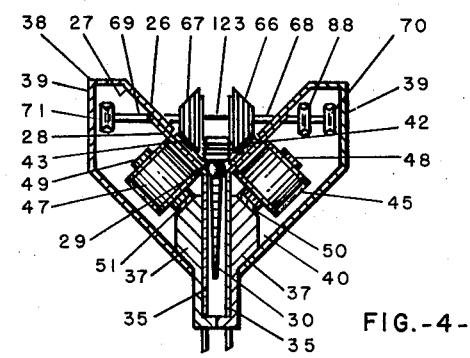
FIG.-4-
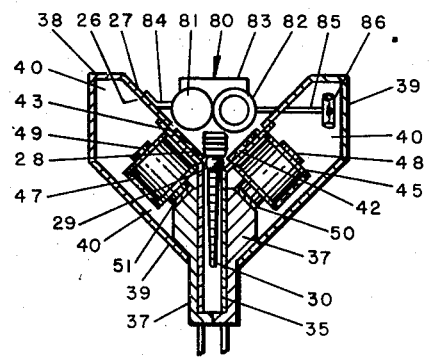
FIG.-5-
INVENTOR.
ROBERT M. INGHAM, JR.
BY
*Walter E. Muller*
ATTORNEY

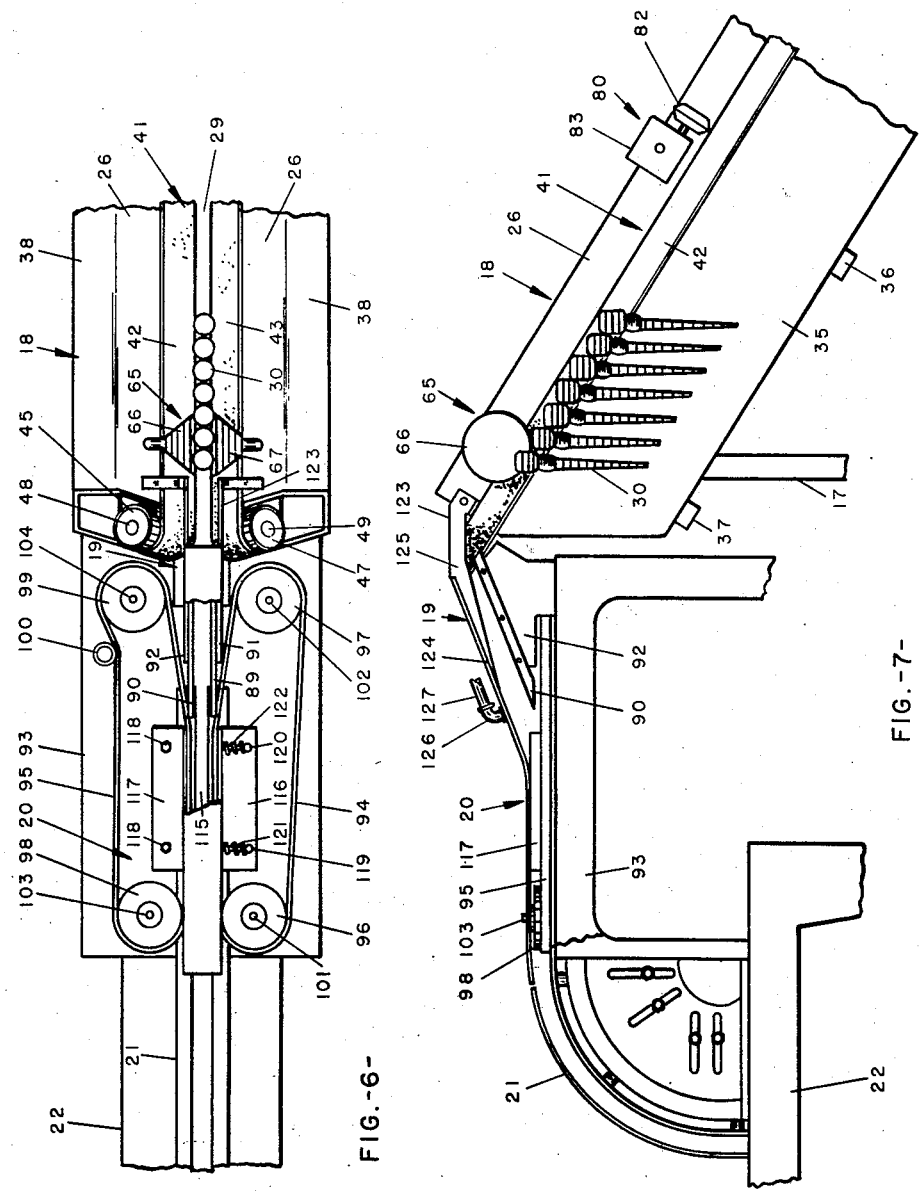

Oct. 7, 1958 R. M. INGHAM, JR 2,854,730
QUILL HANDLING AND POSITIONING MECHANISM
Filed Feb. 19, 1954 4 Sheets-Sheet 4
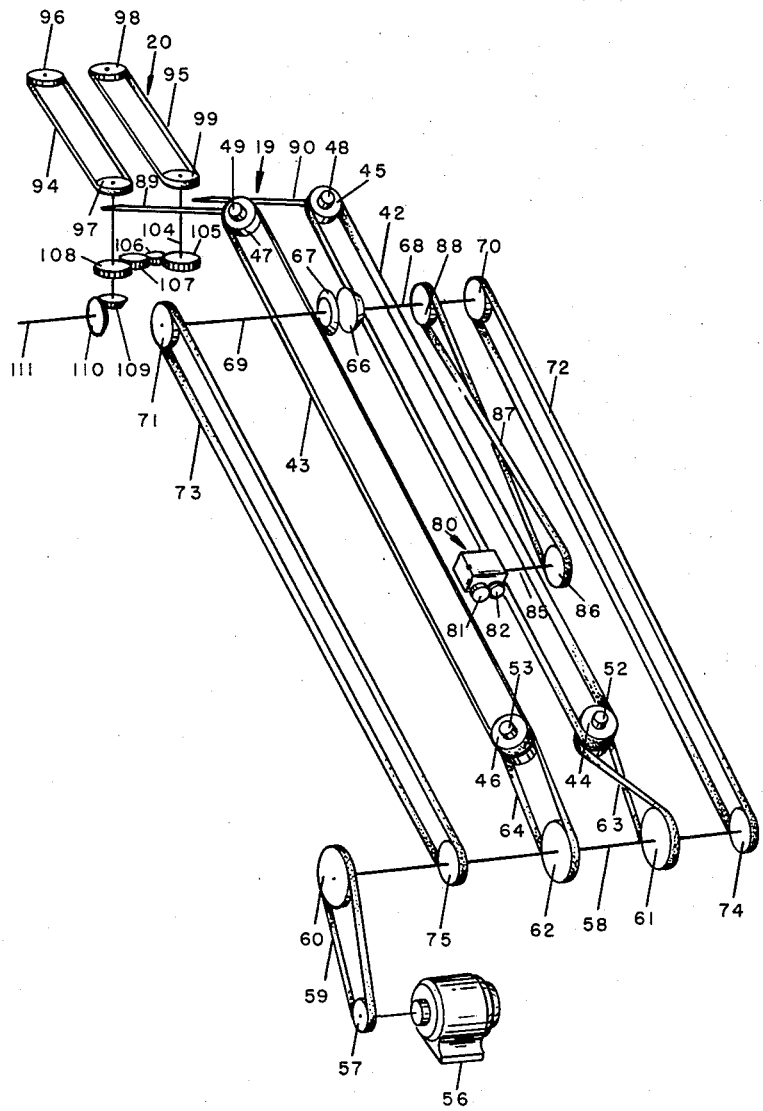
FIG. -8-
INVENTOR.
ROBERT M. INGHAM, JR.
BY
*Walter E. Mueller*
ATTORNEY

United States Patent Office 2,854,730
Patented Oct. 7, 1958

2,854,730

QUILL HANDLING AND POSITIONING MECHANISM

Robert M. Ingham, Jr., Spartanburg, S. C., assignor to Deering Milliken Research Corporation, Pendleton, S. C., a corporation of Delaware Application February 19, 1954, Serial No. 411,480

22 Claims. (Cl. 28—19)

This invention relates to quill handling and positioning mechanisms and more particularly to mechanisms for positioning quills in single file alignment and feeding the same to quill strippers and the like.

Quill stripping machines are designed to remove from quills the bunch that remains after the quills have been ejected from automatic looms and such machines generally require that the quills be fed in single file alignment. While machines that operate satisfactorily with clean quills are available for positioning them in single file alignment, prior to this invention there has been no entirely satisfactory apparatus for positioning quills having bunches and this operation has been performed almost entirely by hand.

Quills containing bunches are infinitely more difficult to work with than clean quills because of the waste yarn or yarn tails. These yarn tails not only become ensnarled with each other thereby forming an entangled maze of waste and quills but also, if possible, wrap around moving parts of apparatus in which they are being handled and impede its proper action. In spite of numerous previous efforts to design a machine capable of handling quills having bunches, the waste problem has previously been insurmountable and such quills continue to be aligned almost entirely by hand.

The number of quills that can be positioned in single file alignment by hand in a given period of time is limited and in the past there has been required one operator for each quill stripping machine. Even with one operator per machine, it has been generally necessary that the quill stripping machine be operated substantially below its maximum capacity rate at all times since even an efficient operator cannot hand align quills rapidly enough to satisfy the capacity of the machine. A further difficulty has been that the magazines with which quill strippers are customarily equipped hold only a few seconds supply and, in addition, the machines have been found to operate much more satisfactorily if the magazine is kept full at all times. As a result, it has been impractical for the operator to leave the machine even momentarily without stopping the machine.

It is a primary object of this invention to provide an efficient mechanism for positioning quills in single file alignment capable of operating satisfactorily with clean quills or quills with bunches.

The above as well as other objects of the invention are accomplished by the provision of a trough shaped receptacle adapted to be mounted on an incline with respect to the horizontal and to receive a supply of quills at the lower end thereof for instance by means of a slide positioned beneath a hopper containing a supply of quills. The recptacle is provided with a lengthwise slot of such width that it is possible for the barrel portions of quills to extend therethrough but impossible for the heads of the quills to pass. The receptacle is also provided with conveyor means adapted to engage the heads of quills having their barrel portions extending downwardly through said slot and transport quills so positioned to the upper end of the trough shaped receptacle. Because of the shape of the receptacle, quills tend to roll or slide to the bottom thereof and become positioned with their barrels through the slot. Any quill becoming thus positioned is immediately moved away from unaligned quills by the conveyor means while, because of the trough being inclined, unaligned quills tend to remain at the lower end thereof. If, however, unaligned quills are carried upwardly in said trough by the conveyor, means are provided for encouraging their proper alignment before allowing them to be transported upwardly the length of the trough shaped receptacle.

It is a feature of the invention that it may be employed for positioning quills having bunches as well as for positioning clean quills.

It is another feature of the invention that it is so positive in action and of such design that the problems resulting from the presence of yarn waste are minimized.

It is still another feature of the invention that it so transports the quills that troublesome yarn tails may readily be severed close to the quill heads.

It is a further feature of the invention that it permits one operator to feed two quill strippers or the like whereas heretofore each and every quill stripper has required an operator.

It is a further feature of this invention that it permits a quill stripper to be run at maximum capacity whereas heretofore it has been necessary that a quill stripper be run at a reduced capacity in order that an even supply of properly aligned quills could be furnished.

It is a still further feature of the invention that the novel quill handling mechanism is simple in construction and requires a minimum of maintenance.

Other features and advantages of the invention will become apparent in view of the following detailed description of a preferred embodiment with reference to the accompanying drawings in which:

Figure 1 is a front elevational view of two quill handling and positioning mechanisms according to this invention being employed to feed two conventional quill strippers from a single hopper.

Figure 2 is a top plan view of a portion of the apparatus shown in Figure 1 including one quill handling and positioning mechanism.

Figure 3 is an end view partially in section.

Figure 4 is a sectional view substantially along line 4, 4 in Figure 2.

Figure 5 is a sectional view substantially along line 5, 5 in Figure 2.

Figure 6 is an enlarged top plan view, with parts broken away, of a portion of the quill handling and positioning mechanism.

Figure 7 is a front view of a portion of the apparatus illustrated in Figure 1 with parts broken away and in section.

Figure 8 is a schematic diagram of principal moving parts.

With reference to the drawings in greater detail, there is illustrated in Figure 1 an elevated hopper 10 supported by a suitable framework 11 and designed to hold a supply of quills 12. Mounted on the front of the hopper 10, for example by bolts 13, is a spout 14 having a sliding gate 15 to control the flow of quills therefrom.

Supported at their lower ends by a suitable framework 16 and at their upper ends by stands 17 are a pair of inclined trough shaped receptacles 18. The receptacles 18 are inclined at an angle to the horizontal of from about 25° to 40° whereby the quills entering the receptacles from hopper 10 tend to remain in the lower ends thereof.

Positioned at the upper end of each of the receptacles 18 is a quill receiving slide, generally indicated by the reference numberal 19, adapted to transfer quills from the trough shaped receptacle 18 to feeder conveyors 20 which are illustrated as delivering quills in single file to the magazines 21 of a pair of conventional quill strippers 22.

Mounted immediately below the sliding gate 15 and adapted to receive quills from spout 14 is a double quill supply slide 23 adapted to deliver quills from hopper 10 to the lower ends of the trough shaped receptacles 18. The supply slide 23 is provided with a forward guard plate 24 and a rear guard plate 25 to prevent quills dropping from spout 14 from bouncing out of the slide. As best illustrated in Figure 2, the quill supply slide 23 is a trough like member extending substantially at right angles to the lower end of receptacle 18 and has a radius of curvature at the center thereof substantially corresponding to the head of a quill whereby quills entering the slide from spout 14 tend to align themselves lengthwise therewith as they move down the slide to the receptacles 18.

The trough shaped receptacle 18 is illustrated as being V-shaped and as having a pair of sides 26 substantially at right angles to each other. Each of the sides 26 has an upper section 27 and a lower section 28 attached to the upper sections in overlapping arrangement (see Figures 4 and 5). The receptacle 18 is also provided with a slot 29, running lengthwise of the trough, of sufficient width to accommodate the barrel portion of a bobbin 30. The lower sections 28 of the trough sides have downwardly extending portions 35 which are maintained in spaced relationship to each other by a pair of support brackets 36 and 37. The upper sections 27 of the trough sides have, in each instance, an extending portion which flares outwardly to form a lip portion 38 and then extends downwardly and inwardly to form side members 39. The lower edges of side members 39 are, in each instance, attached to support brackets 36 and 37 thereby forming enclosed spaces 40 between side members 39 and trough sides 26.

The bottom of the trough shaped receptacle 18 is provided with conveyor means generally indicated by the reference numeral 41 and illustrated as comprising the upper reaches of a pair of endless belts 42 and 43. The upper reaches of endless belts 42 and 43 run adjacent opposite sides of slot 29 so that opposite sides of the heads of the bobbins having their barrel portions extending into slot 29 are supported by the belts and transported thereby. The overlapping arrangement of upper and lower sections of sides 26 provides offset portions to receive the upper reaches of belts 42 and 43 so that the upper faces of the belts are substantially flush with the inner surface of the trough shaped receptacle 18. Endless belt 42 is adapted for travel about a pair of pulleys 44 and 45 located at either end of the trough shaped receptacle 18 while belt 43 is adapted to travel about a pair of pulleys 46 and 47 similarly located but on the opposite side of the trough. Pulleys 45 and 47 at the upper end of the receptacle are journaled for rotation on shafts 48 and 49 carried by the upwardly extending supports 50 and 51 which in turn are rigidly affixed to bracket 37 on either side of the receptacle. Pulleys 44 and 46 at the lower end of the receptacle are journaled for rotation on shafts 52 and 53 carried by supports extending from bracket 36.

Belts 42 and 43 are adapted to be driven in opposite directions so that their upper reaches are, in each instance, traveling upwardly within receptacle 18. The illustrated driving means comprises a motor 56 (see Figure 8) having a drive pulley 57 which rotates shaft 58 by means of a belt 59 and pulley 60. The shaft 58 carries pulleys 61 and 62 which in turn drive pulleys 44 and 46 in opposite directions by means of belts 63 and 64. The pulleys are of such size as to give conveyor means 41 a maximum capacity in quills per minute several times, for instance 2 to 25 and preferably 5 to 15 times that of the quill stripper. This is necessary for the satisfactory operation of the quill positioning mechanism since the conveyor 41 must have empty spaces into which misaligned quills may fall and yet must keep the stripper well supplied with quills.

To prevent misaligned quills from being carried upwardly the length of receptacle 18, means are provided for retarding the upward movement of misaligned quills and encourage their proper alignment. The illustrated retarding means, generally indicated by the reference numeral 65, comprises a pair of rolls 66 and 67 mounted adjacent opposite sides 26 of receptacle 18 and having, in each instance, the shape of a truncated cone so that the contour of their peripheral edges closely corresponds to sides 26 of the receptacle. The rolls 66 and 67 are mounted on shafts 68 and 69 which are in turn journaled through opposite sides 26 of the trough shaped receptacle and extend into the enclosed spaces 40. Mounted on the ends of shafts 68 and 69 within the enclosed spaces 40 are pulleys 70 and 71 which are driven by means of belts 72 and 73 extending to pulleys 74 and 75 mounted for rotation with shaft 58. By this arrangement the rolls 66 and 67 are adapted to be rotated in such a manner that their bottom peripheral edges are moving in a direction generally opposite to the intended direction of transport of quills by the conveyor means 41. The rolls 66 and 67 are capable of serving their intended purpose when driven at practically any convenient R. P. M. but best results have been obtained when the rolls are rotated so that their peripheral edges have a calculated linear velocity of from 5 to 25 times the linear velocity of quills in slide 19.

Also located within trough shaped receptacle 18 is tail cutting means, generally indicated by the reference numeral 80, comprising a pair of rolls 81 and 82 (see Figure 5). The roll 81 is provided with a flat peripheral edge while the roll 82 has a sharpened peripheral edge adapted to contact the flat edge of roll 81 when the two rolls are rotated. The rolls 81 and 82 are adapted to be rotated in such a manner that their peripheral edges at point of contact are moving upwardly substantially over the center of trough shaped receptacle 18 and are driven by conventional gears (not illustrated) mounted within a suitable housing 83 which is secured in proper spaced relationship with respect to receptacle 18 by a support member 84. The gears in housing 83 are driven by a shaft 85 extending through side 26 and carrying a pulley 86 which is adapted to receive a belt 87 running from a pulley 88 on shaft 68.

The quill receiving slide, generally indicated by the reference numeral 19, is positioned at the upper end of the trough shaped receptacle 18 and preferably extends downwardly therefrom at an angle with the respect to the horizontal of from about 5° to 40°. The slide 19 comprises a pair of spaced quill supporting members 89 and 90 positioned with respect to each other so as to allow the passage of the barrel sections of quills therebetween and to support opposite sides of the heads of quills having their barrel portions so positioned. The quill supporting members 89 and 90 are adjustably secured to a pair of upstanding supports 91 and 92 which are carried by a platform 93. The upper ends of quill supporting members 89 and 90 are tapered so that when they are positioned with their upper ends adjacent belts 42 and 43, quills may be readily passed from the conveyor means 41 to the quill slide 19.

Located at the lower end of quill slide 19 is a feeder conveyor, generally indicated by the reference numeral 20, adapted to receive quills from the quill slide 19 and convey them to the magazine 21 of quill stripper 22. The feeder conveyor 20 comprises two endless belts 94 and 95 with belt 94 running about pulleys 96 and 97 and belt 95 running about pulleys 98 and 99. An idler pulley 100 is provided for properly tensioning belt 95. Pulleys 96, 97, 98, and 99 are carried by shafts 101, 102, 103, and 104 respectively. Shafts 101 and 103 are carried by the support platform 93 while shafts 102 and 104 are journaled through the support platform 93 and are adapted to be rotated in opposite directions by gears 105, 106, 107, 108, 109, 110, and shaft 111 which is connected to any suitable source of power, not illustrated. The support platform 93 is provided with a longitudinal slot 115, adapted to receive the barrel portions of a plurality of quills, and carries a pair of opposed upstanding guide members 116 and 117. Guide member 117 is rigidly affixed to the support platform 93 by any suitable means such as by bolts 118, while guide member 116 is resiliently mounted by means of pins 119 and 120 and springs 121 and 122. The upstanding guide members 116 and 117 are provided with rounded edges and are adapted to guide the inner reaches of endless belts 94 and 95 inwardly so that they parallel the opposite edges of slot 115 along a portion of its length but diverge sharply away from the slot 115 at a point near the ends of parallel support members 89 and 90 so that a smooth transition zone from the slide 19 to the conveyor 20 is provided. Guide members 116 and 117 are so positioned that the inner reaches of belts 94 and 95 are sufficiently separated at all times to allow for the passage therebetween of the barrel portions of a plurality of quills but are sufficiently close together to engage opposite sides of the heads of the quills and thereby convey the same to the magazine 21 of quill stripper 22. The resilient mounting of guide plate 116 not only insures firm contact of belts 94 and 95 with quills being conveyed thereby but also prevents jamming in the event that a quill with an oversize head or bunch is encountered.

Positioned immediately above the slide 19 and extending over the feeder conveyor 20 is a quill leveler 123. The quill leveler 123 comprises an elongated member presenting a downwardly facing flat surface 124 over substantially the length of the quill slide 19 and feeder conveyor 20. The lower section of the leveler 123 normally rests on the upper edges of guide members 116 and 117 and the leveler is hinged at its upper end so that it may be lifted to give access to the quills thereunder. The upper section of the leveler 123 has downwardly extending sides 125 (only one of which is illustrated) to assist in maintaining the quills in proper alignment. When in operating position, the flat surface 124 is positioned parallel to the quill support members 89 and 90 and is sufficiently spaced therefrom to freely accommodate the heads of quills. The surface 124 extends upwardly at least to the end of support members 89 and 90 so that as quills are transferred from the conveyor means 41 to the quill feeder slide 19, the head of any quill which happens to be riding high is forced downwardly into proper alignment.

The elongated leveler 123 is provided with a vertically extending orifice which is fitted with a connection 126 adapted to receive an air hose 127 whereby a downward blast of air can be passed over the quills as they move beneath the orifice. As quills pass under the orifice, any tails remaining thereon are blown downwardly alongside the barrel portions of the quills so that they are in the best position to be handled by the quill stripper.

In operation gate 15 is opened sufficiently to allow a supply of quills to fall from spout 14 into slide 23. If desired, the spout 14 can be equipped with quill agitating means to insure a more steady flow of quills with less attention from the operator.

Quills falling from spout 14 contact slide 23 and are guided downwardly into the lower end of receptacle 18. Because of the shape of slide 14 many of the quills become aligned in such a manner that the barrel sections of the quills immediately enter the slot 29 and they are conveyed upwardly by conveyor means 41 to make room for other quills to become properly positioned. Regardless, however, of what position the quills have assumed by the time they reach the receptacle 18, due to the shape of the receptacle, the quills are encouraged to become properly positioned with their barrel portions extending into slot 29 and due to the receptacle 18 being inclined, all quills not properly positioned with respect to the conveyor means 41 are encouraged to remain at the lower end of the receptacle 18 until they have become properly positioned. As soon as a quill becomes properly positioned, it is rapidly moved out of the way thereby making room for other quills to freely move about and become properly positioned.

There is a tendency for the yarn ends on quills while in hopper 10 to become entangled and as the quills having the yarn ends thereon entangled become further separated due to movement toward spout 14, it happens that there are long tails running from the quills in receptacle 18 to quills in spout 14, and unless these tails are severed, they interfere with the operation of the apparatus. It is the purpose of tail cutter 80 to sever such tails. When bobbins having tails leading to spout 14 become properly positioned in conveyor means 41 and are transported beneath tail cutter 80, the tails are brought into the downwardly extending V formed by rolls 81 and 82 and as the tail is pressed against the flat peripheral edge of roll 81 by the sharpened peripheral edge of roll 82 it is effectively severed close to the quill head so that the quill is free to be conveyed upwardly by conveyor means 41 without restraint.

While quills which are not properly positioned with respect to the conveyor means 41 with their barrel portions extending through slot 29 tend to remain in the lower end of the receptacle 18, frequently quills will become improperly aligned lengthwise of the trough shaped receptacle alongside properly aligned quill heads and be carried upwardly by conveyor means 41. The rolls 66 and 67 effectively deter the upward movement of such quills and encourage their proper alignment. If a misaligned quill is being conveyed upwardly with its barrel portion foremost, the tip of the barrel portion of the quill is, in most instances, engaged by roll 66 or 67 and moved upwardly and outwardly with respect to the center of the trough until the quill is turned completely overlengthwise. In many instances the quill will then fall into proper alignment without more but in instances where quills are present in the conveyor in such numbers that it is impossible for the quill to fall into position, the head of the quill will then contact one of the rolls 66 or 67 and will be propelled in such a manner as to encourage the quill to slide downwardly within the trough for a distance so that in effect the quill searches the conveyor for an unused space. Eventually there will be an unused space of sufficient length in conveyor 41 to allow the misaligned quill to fall into position.

After leaving the trough shaped receptacle 18 the quills are passed to quill receiving slide 19 which serves as a convenient means for transferring the properly aligned quills to feeder conveyor 20 without disrupting their alignment. The feeder conveyor 20 takes the properly aligned quills from feeder slide 19 and passes them to the magazine 21 of quill stripper 22. This conveyor not only serves to keep the magazine of the quill stripper filled but also serves as a reservoir of properly aligned quills.

Having thus described my invention, what I claim is:

1. A quill handling and positioning mechanism comprising in combination an elongated, trough shaped receptacle adapted to be mounted on an incline with respect to the horizontal and to receive a supply of quills at the lower end thereof, said receptacle having a lengthwise slot in the bottom thereof adapted to receive the barrel portions of a plurality of quills, conveyor means located in said receptacle and adapted to engage the heads of quills having their barrel portions extending into said slot and to transport said quills, in single file alignment, upwardly and lengthwise of said receptacle, and means adapted to retard the upward movement of misaligned quills and to encourage their proper alignment comprising two transversely spaced apart members mounted within said receptacle and each having a surface positioned to be laterally outside the path of properly aligned quills but to contact one end of a misaligned quill and raise the same to the extent necessary to turn the quill over endwise toward the lower end of said receptacle, said members each being disposed with at least a portion of its said surface extending at a longitudinally acute angle relative to the upper surface of said trough along said slot.

2. A mechanism as in claim 1 having tail cutting means adapted to sever long trailing yarn ends from said quills.

3. A quill handling and positioning mechanism comprising in combination an elongated, trough shaped receptacle adapted to be mounted on an incline with respect to the horizontal and to receive a supply of quills at the lower end thereof, said receptacle having a lengthwise slot in the bottom thereof adapted to receive the barrel portions of a plurality of quills, conveyor means located in said receptacle and adapted to engage the heads of quills having their barrel portions extending into said slot and to transport said quills, in single file alignment, upwardly and lengthwise of said receptacle, and means adapted to retard the upward movement of misaligned quills and to encourage their proper alignment, said means adapted to retard the upward movement of misaligned quills comprising a pair of rolls positioned with their lower peripheral edges within said trough shaped receptacle and in close proximity to a section of the inside surface of said trough shaped receptacle, the peripheral edges of said rolls having a contour substantially corresponding to that of said inside surface adjacent the lower extremities of said edges, said rolls being adapted for rotation about a horizontal axis substantially at right angles to the intended direction of movement of quills by said conveyor means and in such a manner that the bottom peripheral edge of each of said rolls is moving in a direction generally opposite to the intended direction of transport of quills by said conveyor means and said rolls being positioned to present opposed end faces each of which is in proximate spaced relationship to the heads of properly aligned quills carried between said faces by said conveyor means.

4. A mechanism as in claim 3 wherein said conveyor means comprises a pair of endless belts, each of said belts being adapted to travel about a pair of pulleys at least one of which is adapted to be driven, and said belts being so positioned that the upper reaches thereof are adapted to run adjacent opposite sides of said slot.

5. A mechanism as in claim 4 wherein the inner walls of said trough shaped receptacle on each side of said slot are provided in each instance with an offset portion to receive the upper reach of one of said belts so that the upper face of said belt is substantially flush with the inner surface of said trough shaped receptacle.

6. A quill handling and positioning mechanism comprising in combination an elongated substantially V-shaped trough adapted to be mounted on an incline with respect to the horizontal and to receive a supply of quills at the lower end thereof, said trough having a slot in the extreme bottom thereof extending from near the lower end to the upper end of said trough, said slot being adapted to receive the barrel portions of a plurality of quills, conveyor means in said trough adapted to engage the heads of quills having their barrel portions extending into said slot and to transport, in single file alignment, said quills upwardly and lengthwise of said trough, said conveyor means comprising the upper reaches of a pair of endless belts adapted to travel, in each instance, about a pair of pulleys, and means adapted to retard the upward movement of misaligned quills and encourage their proper alignment comprising two transversely spaced apart members mounted within said receptacle and each having a surface positioned to be laterally outside the path of properly aligned quills but to contact one end of a misaligned quill and raise the same to the extent necessary to turn the quill over endwise toward the lower end of said receptacle, said members each being disposed with at least a portion of its said surface extending at a longitudinally acute angle relative to the upper surface of said trough along said slot.

7. A quill handling and positioning mechanism comprising in combination an elongated substantially V-shaped trough adapted to be mounted on an incline with respect to the horizontal and to receive a supply of quills at the lower end thereof, said trough having a slot in the extreme bottom thereof extending from near the lower end to the upper end of said trough, said slot being adapted to receive the barrel portions of a plurality of quills, conveyor means in said trough adapted to engage the heads of quills having their barrel portions extending into said slot and to transport, in single file alignment, said quills upwardly and lengthwise of said trough, said conveyor means comprising the upper reaches of a pair of endless belts adapted to travel, in each instance, about a pair of pulleys, and means adapted to retard the upward movement of misaligned quills and encourage their proper alignment, said means adapted to retard the upward movement of misaligned quills comprising a pair of rolls having, in each instance, substantially the shape of a truncated cone, said rolls being mounted within said trough and adapted for rotation on an axis substantially at right angles to the length of said trough, said rolls being mounted on opposite sides of said trough with, in each instance, the end of lesser diameter facing outwardly from the center of the trough and said rolls being so positioned that the ends of larger diameter are substantially equidistant from the center of said trough and sufficiently separated to allow the free passage of properly aligned quills carried by said conveyor means.

8. A mechanism as in claim 7 having tail cutting means positioned within said trough said tail cutting means being adapted to sever long trailing yarn ends from said quills.

9. A mechanism as in claim 8 wherein said tail cutting means comprises a pair of rolls at least one of which is adapted to be driven, the first of said rolls having a flat hard peripheral surface and the second of said rolls having a sharpened peripheral edge adapted to contact the flat hard surface of said first roll when the rolls are rotated, and means to secure the rolls to said trough in close proximity to the heads of quills carried by said conveyor means.

10. A mechanism as in claim 6 having a quill supply slide extending into the lower end of said trough, said quill supply slide being substantially trough shaped and having a radius of curvature in the center thereof substantially corresponding to the head of a quill whereby quills passing downwardly in said slide are encouraged to align themselves lengthwise therewith.

11. A quill handling and positioning mechanism comprising in combination an elongated substantially V-shaped trough adapted to be mounted on an incline with respect to the horizontal and to receive a supply of quills at the lower end thereof, said trough having a slot in the extreme bottom thereof extending from near the lower end to the upper end of said trough, said slot being adapted to receive the barrel portions of a plurality of quills, conveyor means in said trough adapted to engage the heads of quills having their barrel portions extending into said slot and to transport, in single file alignment, said quills upwardly and lengthwise of said trough, said conveyor means comprising the upper reaches of a pair of endless belts adapted to travel, in each instance, about a pair of pulleys, and means adapted to retard the upward movement of misaligned quills and encourage their proper alignment, a quill receiving slide cooperating with said conveyor means and adapted to receive quills transported from the upper end of said trough by said conveyor means, said quill receiving slide comprising a pair of parallel spaced members adapted to support opposite sides of the heads of quills having their barrel portions extending between said spaced members, said quill receiving slide extending downwardly from the upper end of said trough and being provided with a quill leveling device comprising an elongated member mounted above said slide, said elongated member presenting along a portion of its length a downwardly facing flat surface parallel to said slide and spaced sufficiently therefrom to provide clearance for quills having their heads firmly against said slide but insufficient clearance for raised quills, said flat surface extending at least to the upper end of said slide whereby upwardly extending quills leaving said conveyor means contact said surface and are forced downwardly into proper relationship with respect to said slide, said elongated member being constructed to provide a vertically extending orifice, an air hose connected to said orifice and adapted to provide a downward blast of air whereby yarn tails on said quills are encouraged to trail downwardly alongside the barrel portions of said quills.

12. A quill handling and positioning mechanism comprising in combination an elongated substantially V-shaped trough adapted to be mounted on an incline with respect to the horizontal and to receive a supply of quills at the lower end thereof, said trough having a slot in the extreme bottom thereof extending from near the lower end to the upper end of said trough, said slot being adapted to receive the barrel portions of a plurality of quills, conveyor means in said trough adapted to engage the heads of quills having their barrel portions extending into said slot and to transport, in single file alignment, said quills upwardly and lengthwise of said trough, quill supply means positioned above said trough and adapted to furnish a supply of quills to the lower end of said trough, and tail cutting means adapted to sever yarn ends extending from said supply means to quills being conveyed by said conveyor means, said tail cutting means comprising a pair of rolls, one of said rolls having a flat peripheral edge and the other of said rolls having a sharpened peripheral edge adapted to be rotated in contact with the flat peripheral edge of the first roll so that the peripheral edges of said rolls at point of contact are moving upwardly substantially over the center of said trough.

13. A mechanism as in claim 12 wherein said tail cutting means is located within said trough whereby the yarn ends are severed close to the quill heads.

14. A quill handling and positioning mechanism adapted to feed quills in single file alignment to a quill stripping machine, which mechanism comprises in combination an elongated substantially V-shaped trough adapted to be mounted on an incline with respect to the horizontal and to receive a supply of quills at the lower end thereof, said trough having a slot in the extreme bottom thereof extending from near the lower end to the upper end of said trough, said slot being adapted to receive the barrel portions of a plurality of quills; conveyor means in said trough adapted to engage the heads of quills having their barrel portions extending into said slot and to transport, in single file alignment, said quills upwardly and lengthwise of said trough, said conveyor means comprising the upper reaches of a pair of endless belts adapted to travel, in each instance, about a pair of pulleys; means adapted to retard the upward movement of misaligned quills and encourage their proper alignment, said means comprising a pair of rolls having, in each instance, substantially the shape of a truncated cone, said rolls being mounted within said trough and adapted for rotation in a vertical plane on an axis substantially at right angles to the length of said trough, said rolls being mounted on opposite sides of said trough with, in each instance, the end of lesser diameter facing outwardly from the center of the trough and said rolls being so positioned that the ends of larger diameter are substantially equidistant from the center of said trough and sufficiently separated to allow the free passage of properly aligned quills carried by said conveyor means; a quill supply slide extending into the lower end of said trough at substantially right angles thereto said slide being substantially trough shaped and having a center portion with a radius of curvature substantially corresponding to the head of a quill; quill supply means positioned above said quill supply slide and adapted to supply quills thereof; tail cutting means positioned within said trough, said tail cutting means comprising a pair of rolls mounted with their bottom peripheral edges substantially equidistant from the bottom of said trough and adapted for rotation within a plane substantially at right angles to the longitudinal axis of said trough, the first of said rolls having a flat peripheral surface and the second of said rolls having a sharper peripheral edge adapted to contact the flat surface of said first roll when the rolls are rotated, and means to rotate said rolls in opposite directions so that their peripheral edges are traveling in an upwardly direction over the center of said trough whereby yarn ends, from quills transported under said tail cutter by said conveyor means, trailing to said quill supply means are severed close to the heads of said quills; a quill receiving slide positioned at the upward end of said trough and adapted to receive quills conveyed from said trough by said conveyor means, said quill receiving slide comprising in combination two elongated support members spaced to support opposite sides of quill heads and allow passage therebetween of the barrel portions of the said quills; and a feeder conveyor adapted to receive quills from said quill receiving slide and feed said quills in single file alignment to a quill stripper.

15. Quill feeding and positioning apparatus comprising a pair of spaced apart movable continuous belts, support means for each of said belts, the upper reaches of each of said belts being inclined upwardly and outwardly in a direction transverse to the direction of normal movement of said reaches to form an open bottomed trough having movable inclined sides, and means for moving said belts each in the same direction along their upper reaches, said trough being inclined with respect to the horizontal.

16. In combination, a conveyor for yarn-tail-carrying quills and the like, and having a conveying surface, and at least one pair of tail-cutting mutually peripherally engaging rolls disposed in substantially vertical alignment with and adjacent said conveyor for cutting the tails of said quills, and means for driving said rolls, said rolls being disposed each with its plane of rotation transverse to the direction of the normal flow of quills therepast, said conveyor being beneath said rolls, said conveyor forming a slotted trough having a pair of endless belts forming inclined side surfaces of said trough.

17. The combination according to claim 16 further comprising a slotted slide adjacent the discharge end of said conveyor, said belt conveyor being directed generally upward toward said slide, said slide being directed generally downwardly away from the discharge end of said belt conveyor, and trough side plates disposed beneath and on each side of the slot formed by said slotted trough belt conveyor so as to prevent transverse jamming of depending quills as they proceed through said belt conveyor.

18. In combination, a first conveying surface for yarn-entangled quills and the like and having a discharge end, a second conveying surface spaced beneath the discharge end of said first surface, and a pair of mutually peripherally engaging cutter rolls disposed between the discharge end of said first conveying surface and said second conveying surface for cutting the trailing entangled yarn as the quills fall from said first surface discharge end onto and are conveyed by the second surface, each of said cutter rolls being rotated in a plane transverse to the general direction of flow of said quills past said rolls whereby the peripheral movement of said rolls at the bite formed therebetween is transverse to the general direction of movement of yarn tails carried by said quills.

19. The combination according to claim 18 wherein the normal direction of quill flow on one of said conveying surfaces is in a different direction relative to the normal direction of quill flow on the other of said conveying surfaces, said directions being as indicated in plan view of said conveying surfaces.

20. Apparatus according to claim 15, further comprising a yarn end cutter disposed above and in close adjacency to said belts.

21. Apparatus according to claim 20 wherein said cutter comprises a pair of mutually peripherally engaging cutter rolls disposed above said belts, the plane of rotation of said rolls being disposed transverse to the longitudinal length of said belts.

22. In combination, first and second conveying surfaces for yarn engaging objects and disposed at a lateral angle to one another in respect of the general direction of object flow on the respective surfaces, said first conveying surface having its discharge end above an entrance area on said second conveying surface and including a quill and yarn tail lateral-directional-change-retarding surface opposing a change of lateral direction of quill and yarn tail motion to the general direction of movement of quills on said second conveying surface, whereby tails extending between quills on said discharge end of said first conveying surface and quills being conveyed on said second surface are tensioned, and a yarn cutter disposed between said discharge end and said entrance area, said cutter being in a position such that said tensioned extending tails are thereby brought into effective engagement with said cutter for severance of said tails by said cutter.

References Cited in the file of this patent

UNITED STATES PATENTS

| | | |
|---|---|---|
| 1,191,082 | Johnston | July 11, 1916 |
| 1,550,803 | Harbison | Aug. 25, 1925 |
| 1,813,697 | Dellaree | July 7, 1931 |
| 2,070,193 | Alderman | Feb. 9, 1937 |
| 2,149,778 | Kimbirl | Mar. 7, 1939 |
| 2,383,270 | Niederer | Aug. 21, 1945 |
| 2,471,479 | Coons | May 31, 1949 |